(12) United States Patent
DeWald et al.

(10) Patent No.: US 12,429,243 B2
(45) Date of Patent: Sep. 30, 2025

(54) REFRIGERANT DETECTION SYSTEM WITH AUXILIARY CONTROL CIRCUITRY

(71) Applicant: Johnson Controls Tyco IP Holdings LLP, Milwaukee, WI (US)

(72) Inventors: Mason Sloan DeWald, Wichita, KS (US); Andrew Michael Boyd, Wichita, KS (US); Theresa Thy Nguyen Gillette, Wichita, KS (US); D Gamage Methmini Umayangana Maheshwari Sumanasekara, Wichita, KS (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 513 days.

(21) Appl. No.: 17/835,675

(22) Filed: Jun. 8, 2022

(65) Prior Publication Data
US 2023/0400208 A1    Dec. 14, 2023

(51) Int. Cl.
*F24F 11/63* (2018.01)
*G05D 23/19* (2006.01)

(52) U.S. Cl.
CPC .......... *F24F 11/63* (2018.01); *G05D 23/1917* (2013.01); *F25B 2500/222* (2013.01)

(58) Field of Classification Search
CPC . F24F 11/63; F24F 11/50; F24F 11/36; G05D 23/1917; F25B 2500/222
See application file for complete search history.

(56) References Cited

U.S. PATENT DOCUMENTS

| | | | |
|---|---|---|---|
| RE38,406 E * | 1/2004 | Faris | G05D 7/0676 388/825 |
| 2010/0211224 A1* | 8/2010 | Keeling | F24F 11/63 700/277 |
| 2012/0221150 A1* | 8/2012 | Arensmeier | G05B 23/0221 702/183 |
| 2014/0034284 A1* | 2/2014 | Butler | F24F 11/65 165/207 |
| 2019/0170383 A1* | 6/2019 | Weinert | F25B 49/025 |
| 2020/0132321 A1* | 4/2020 | Blanton | F24F 11/77 |
| 2020/0248919 A1* | 8/2020 | Green | G05B 23/027 |
| 2022/0042698 A1* | 2/2022 | Butler | F24F 11/77 |

* cited by examiner

*Primary Examiner* — Christopher E. Everett
(74) *Attorney, Agent, or Firm* — Fletcher Yoder, P.C.

(57) ABSTRACT

A heating, ventilation, and/or air conditioning (HVAC) system includes auxiliary control circuitry configured to communicatively couple to a thermostat of the HVAC system. The auxiliary control circuitry is configured to receive a control signal from the thermostat and block subsequent transmission of the control signal in response to receipt of data indicative of a detected refrigerant external to a refrigerant circuit of the HVAC system.

18 Claims, 10 Drawing Sheets

REFRIGERANT DETECTION SYSTEM WITH AUXILIARY CONTROL CIRCUITRY

BACKGROUND

This section is intended to introduce the reader to various aspects of art that may be related to various aspects of the present disclosure and are described below. This discussion is believed to be helpful in providing the reader with background information to facilitate a better understanding of the various aspects of the present disclosure. Accordingly, it should be noted that these statements are to be read in this light, and not as admissions of prior art.

Heating, ventilation, and/or air conditioning (HVAC) systems are utilized in residential, commercial, and industrial environments to control environmental properties, such as temperature and humidity, for occupants of the respective environments. An HVAC system may control the environmental properties through control of a supply air flow delivered to the environment. For example, the HVAC system may place the supply air flow in a heat exchange relationship with a refrigerant of a vapor compression circuit to condition the supply air flow. In some embodiments, it may be desirable to operate the HVAC system in a particular manner in response to a detection of a refrigerant (e.g., external to the HVAC system). For example, the HVAC system may operate to dissipate refrigerant external to the HVAC system. However, different HVAC systems may have different embodiments of control systems, such as a different arrangement of control circuitry. Thus, it may be difficult and/or costly to manufacture, modify, or otherwise configure each of the different HVAC systems to operate in a desirable manner in response to detection of external refrigerant.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a heating, ventilation, and/or air conditioning (HVAC) system includes auxiliary control circuitry configured to communicatively couple to a thermostat of the HVAC system. The auxiliary control circuitry is configured to receive a control signal from the thermostat and block subsequent transmission of the control signal in response to receipt of data indicative of a detected refrigerant external to a refrigerant circuit of the HVAC system.

In one embodiment, a non-transitory computer-readable medium includes instructions stored thereon. The instructions, when executed by processing circuitry, are configured to cause the processing circuitry to receive a control signal from a thermostat of a heating, ventilation, and/or air conditioning (HVAC) system, transmit the control signal received from the thermostat to enable operation of the HVAC system based on the control signal in response to non-receipt of data indicative of a refrigerant detected external to a refrigerant circuit of the HVAC system, and block transmission of the control signal received from the thermostat to suspend an operation of the HVAC system in response to receipt of the data indicative of the refrigerant detected external to the refrigerant circuit.

In one embodiment, a heating, ventilation, and/or air conditioning (HVAC) system includes a thermostat configured to transmit a control signal indicative of a call for conditioning and auxiliary control circuitry configured to receive the control signal from the thermostat. In response to non-receipt of data indicative of a detection of refrigerant external to a refrigerant circuit of the HVAC system, the auxiliary control circuitry is configured to transmit the control signal received from the thermostat to cause operation of the refrigerant circuit based on the control signal. In response to receipt of data indicative of the detection of refrigerant external to the refrigerant circuit, the auxiliary control circuitry is configured to block transmission of the control signal received from the thermostat.

DESCRIPTION OF DRAWINGS

Various aspects of this disclosure may be better understood upon reading the following detailed description and upon reference to the drawings in which.

DETAILED DESCRIPTION

Figure 1:
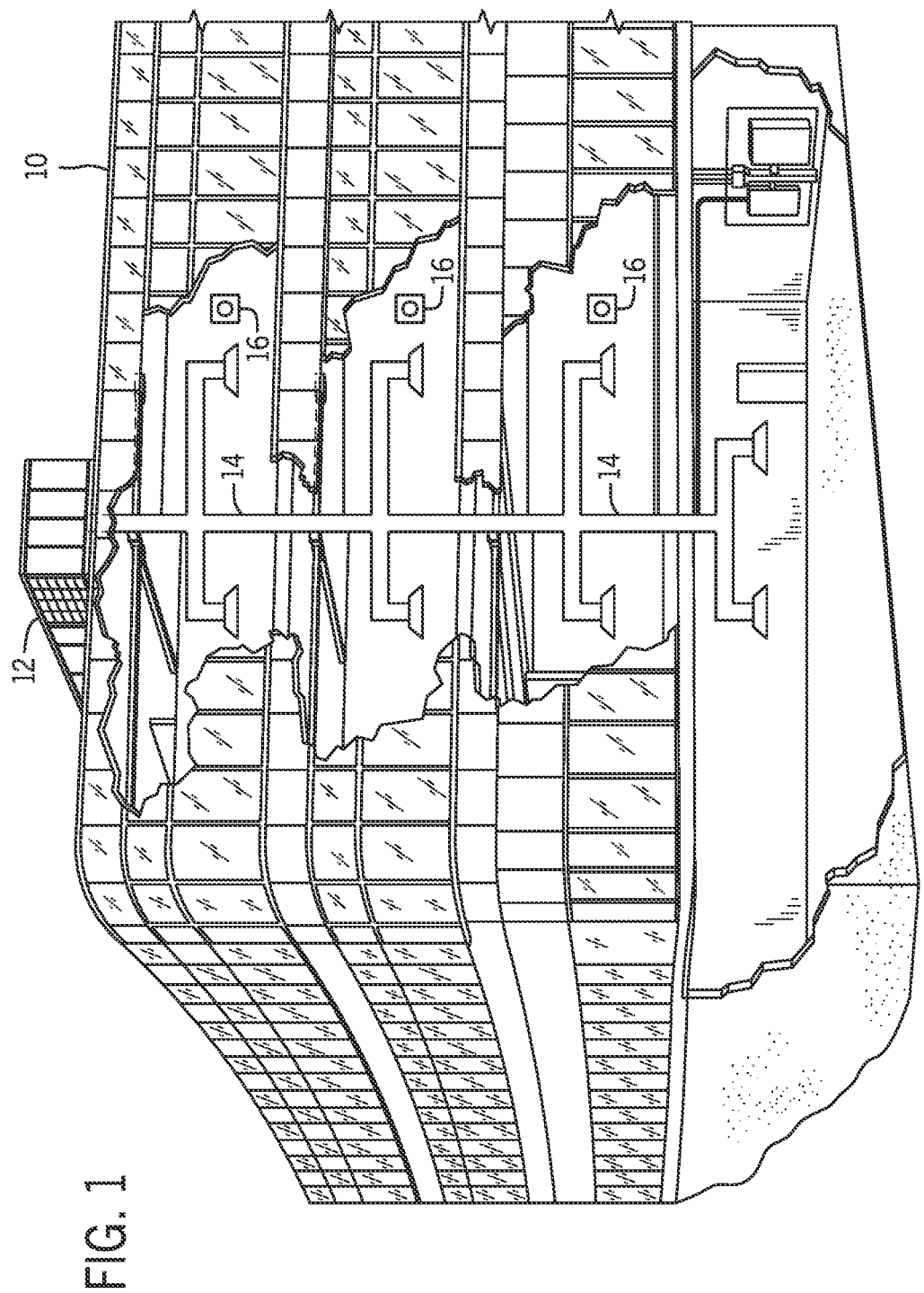
FIG. 1 is a perspective view of an embodiment of a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system. The HVAC system may include a vapor compression system configured to circulate a refrigerant to condition a conditioning fluid, such as an air flow. For example, the vapor compression system may place the refrigerant in a heat exchange relationship with the air flow to heat, cool, and/or dehumidify the air flow. The vapor compression system may then deliver the conditioned air flow to a space serviced by the HVAC system to condition the space.

In certain embodiments, the HVAC system may include a control system configured to operate components of the vapor compression system in order to condition the air flow. For example, the control system may include a thermostat configured to output control signals, such as calls for conditioning, and control circuitry configured to regulate operation of the components of the vapor compression system, such as in response to the control signals transmitted by the thermostat. In some circumstances, refrigerant circulated within the HVAC system may inadvertently escape the HVAC system. It may be desirable for the control system to detect refrigerant external to the HVAC system and to adjust operation of the HVAC system in response to the detection of external refrigerant. However, different HVAC systems may have different embodiments or arrangements of control systems. For instance, different embodiments of thermostats (e.g., a communicating thermostat, a conventional thermostat) and/or control circuitry may be incorporated in different HVAC systems, and/or the communication link or coupling between the control system and the components of the vapor compression system may be different for different HVAC systems. As such, it may be difficult to enable the control systems of different HVAC systems to operate in a desirable manner in response to a detection of refrigerant external to the HVAC system (e.g., escaped refrigerant). By way of example, manufacturing and/or configuring a particular control system for each HVAC system to operate in response to a detection of refrigerant external to the HVAC system may increase a cost and/or complexity associated with manufacture, installation, and/or operation of the HVAC systems.

Thus, it is presently recognized that there is a desire to improve ease of manufacturing, configuring, or otherwise enabling different HVAC systems to operate in response to detection of refrigerant external to the HVAC system. Accordingly, embodiments of the present disclosure are directed to auxiliary control circuitry that may be readily incorporated in different embodiments of HVAC systems and enable each of the HVAC systems to operate in an alternative operating mode in response to a detection of refrigerant external to the HVAC system. For example, the auxiliary control circuitry may include features (e.g., ports) that may readily couple to (e.g., communicatively couple to) different embodiments of thermostats. The auxiliary control circuitry may also include features that may readily couple to (e.g., communicatively couple to) different embodiments of other control circuitry of the HVAC system configured to operate a component of the HVAC system (e.g., of the vapor compression system). Additionally or alternatively, the auxiliary control circuitry may include features that may readily couple to (e.g., communicatively couple to) one or more components of the HVAC system. As such, instead of manufacturing or configuring a specific (e.g., different) control system for each particular HVAC system embodiment to operate the HVAC system in response to detection of refrigerant external to the HVAC system, a single embodiment of the auxiliary control circuitry may be incorporated in different embodiments of HVAC systems, thereby reducing a cost and/or complexity of manufacture and/or implementation of the HVAC systems.

In each implementation, the auxiliary control circuitry may be configured to receive an indication of detected refrigerant external to the HVAC system and to control the HVAC system in response to the detection. As an example, in response to receiving the indication of detected refrigerant, the auxiliary control circuitry may be configured to block one or more operations of the HVAC system based on a call for conditioning transmitted by the thermostat. For instance, blocking certain operations of the HVAC system based on the call for conditioning may suspend circulation of the refrigerant within the vapor compression system to block escape of the refrigerant from the HVAC system. Additionally, the auxiliary control circuitry may transmit a control signal to operate a fan of the HVAC system to dissipate refrigerant that is external to the HVAC system. In this manner, the auxiliary control circuitry may mitigate an impact of the external refrigerant on the HVAC system and in an area surrounding the HVAC system. Indeed, the auxiliary control circuitry may improve the operation of different embodiments of the HVAC system in response to the detection of refrigerant external to the HVAC system (e.g., external to the vapor compression system).

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
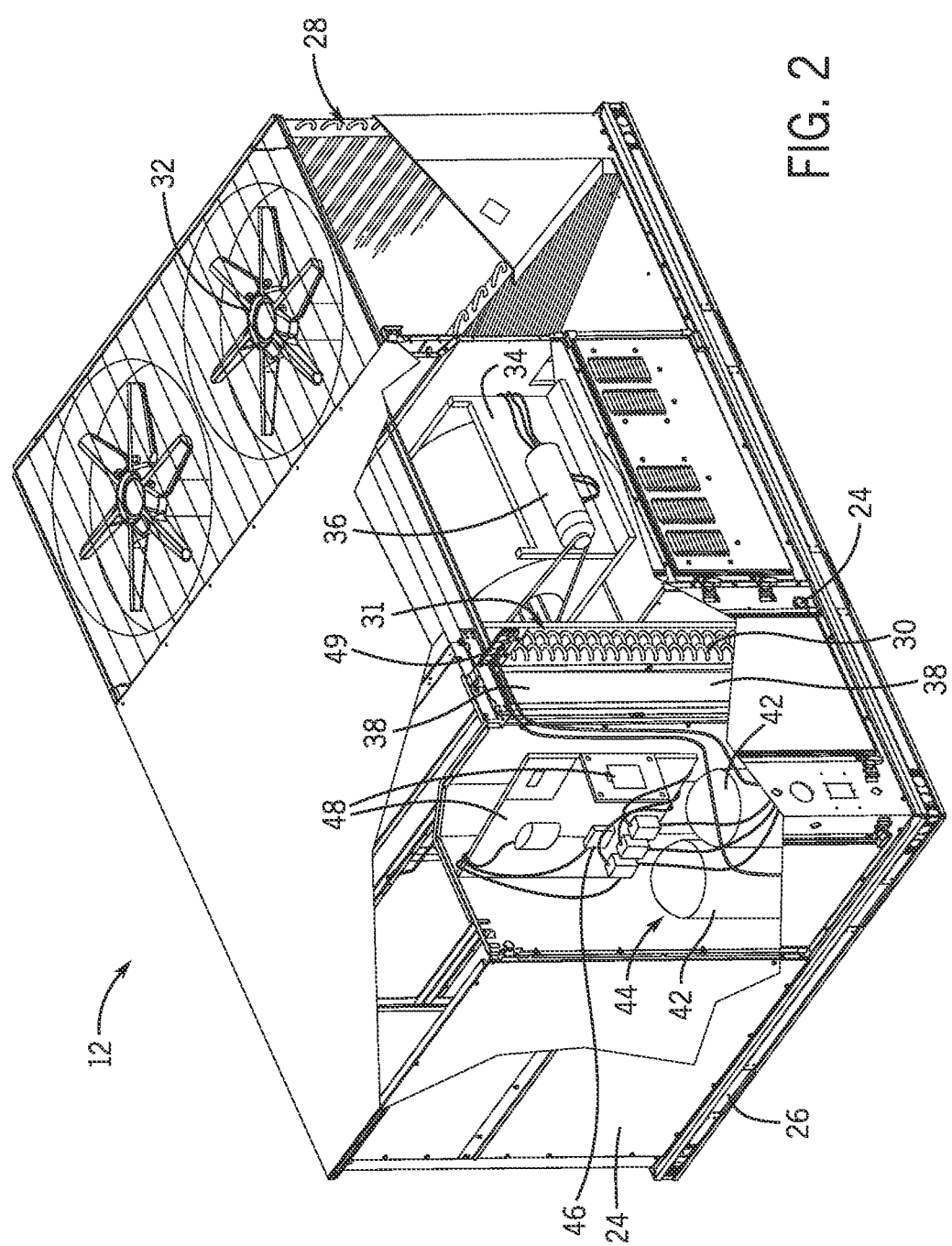
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit onto "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, R-1234ze, and/or R-1233zd, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. Additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
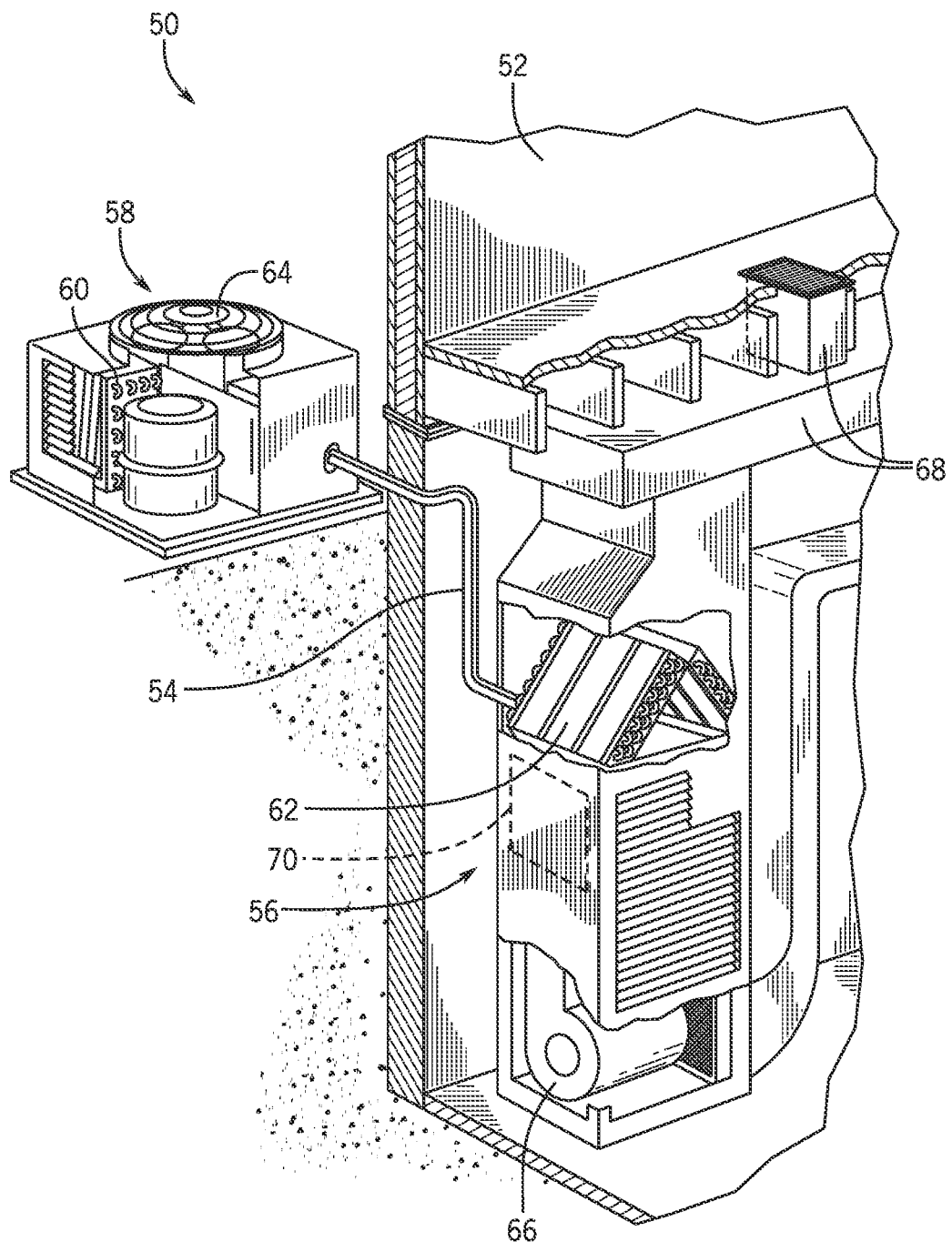
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
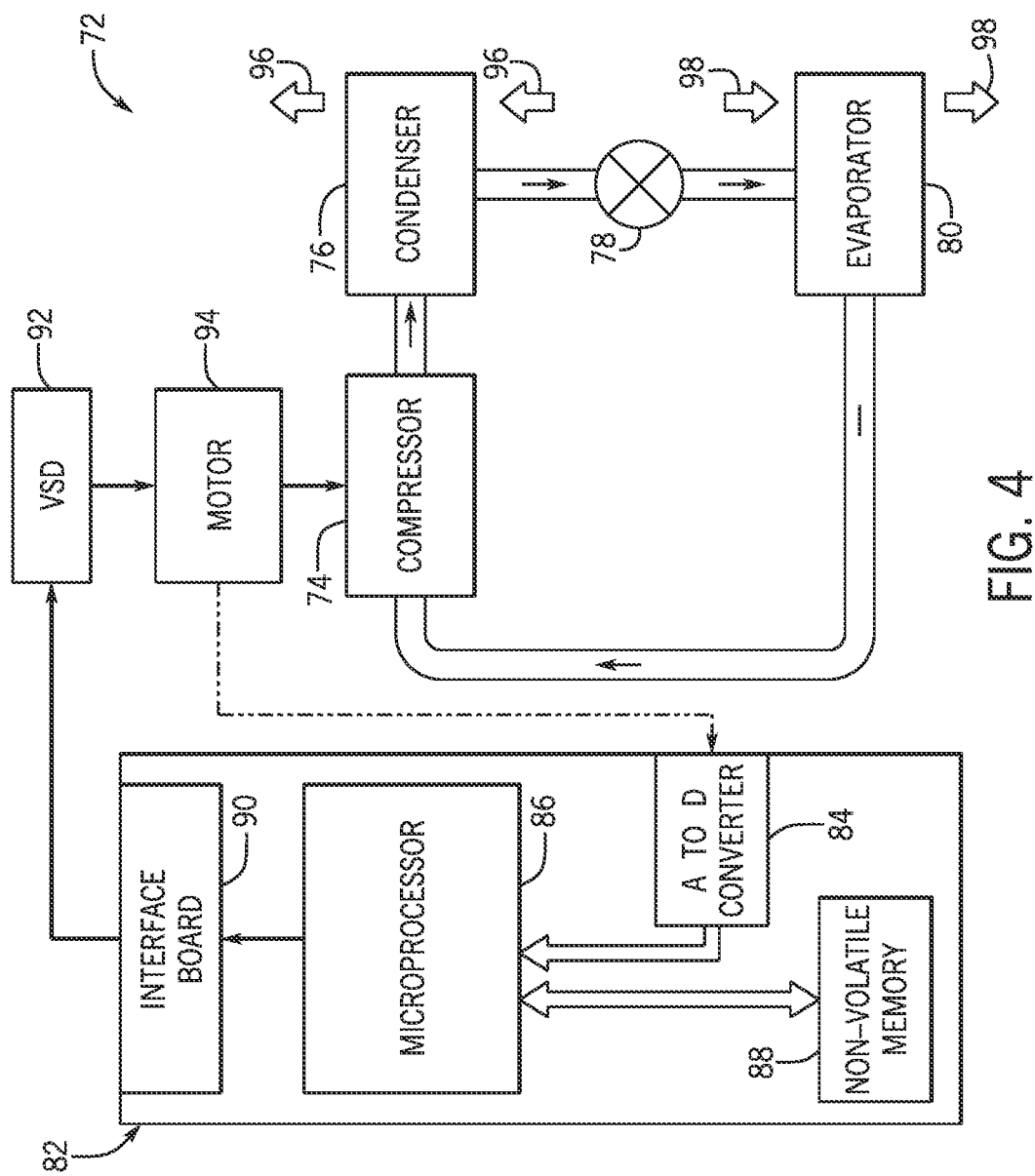
FIG. 4 is a schematic diagram of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

The present disclosure is directed to auxiliary control circuitry configured to detect refrigerant external to an HVAC system (e.g., external to a vapor compression system) and to operate the HVAC system in an alternative operating mode to mitigate effects of the external refrigerant. For example, the auxiliary control circuitry may be configured to communicatively couple to a thermostat of the HVAC system. During the alternative operating mode, the auxiliary control circuitry may be configured to block operation of the HVAC system based on control signals, such as calls for conditioning, transmitted by the thermostat. In this manner, the auxiliary control circuitry may block circulation of the refrigerant through the HVAC system (e.g., through the vapor compression system) in response to a detected refrigerant external to the HVAC system. In some embodiments of the alternative operating mode, the auxiliary control circuitry may also transmit a control signal configured to cause a fan of the HVAC system to operate and dissipate the refrigerant external to the HVAC system. The auxiliary control circuitry may be readily implemented in each of a plurality of different embodiments of the HVAC system. By way of example, the auxiliary control circuitry may be configured to individually couple to multiple embodiments of thermostats that may be incorporated in different HVAC systems to block transmission of control signals from the different thermostats in the alternative operating mode. The auxiliary control circuitry may also be configured to communicatively couple to additional control circuitry and/or to another component of the HVAC system to operate the component of the HVAC system in the alternative operating mode. As such, the auxiliary control circuitry may improve ease of manufacture and/or configuration of different HVAC systems to operate in the alternative operating mode.

Figure 5:
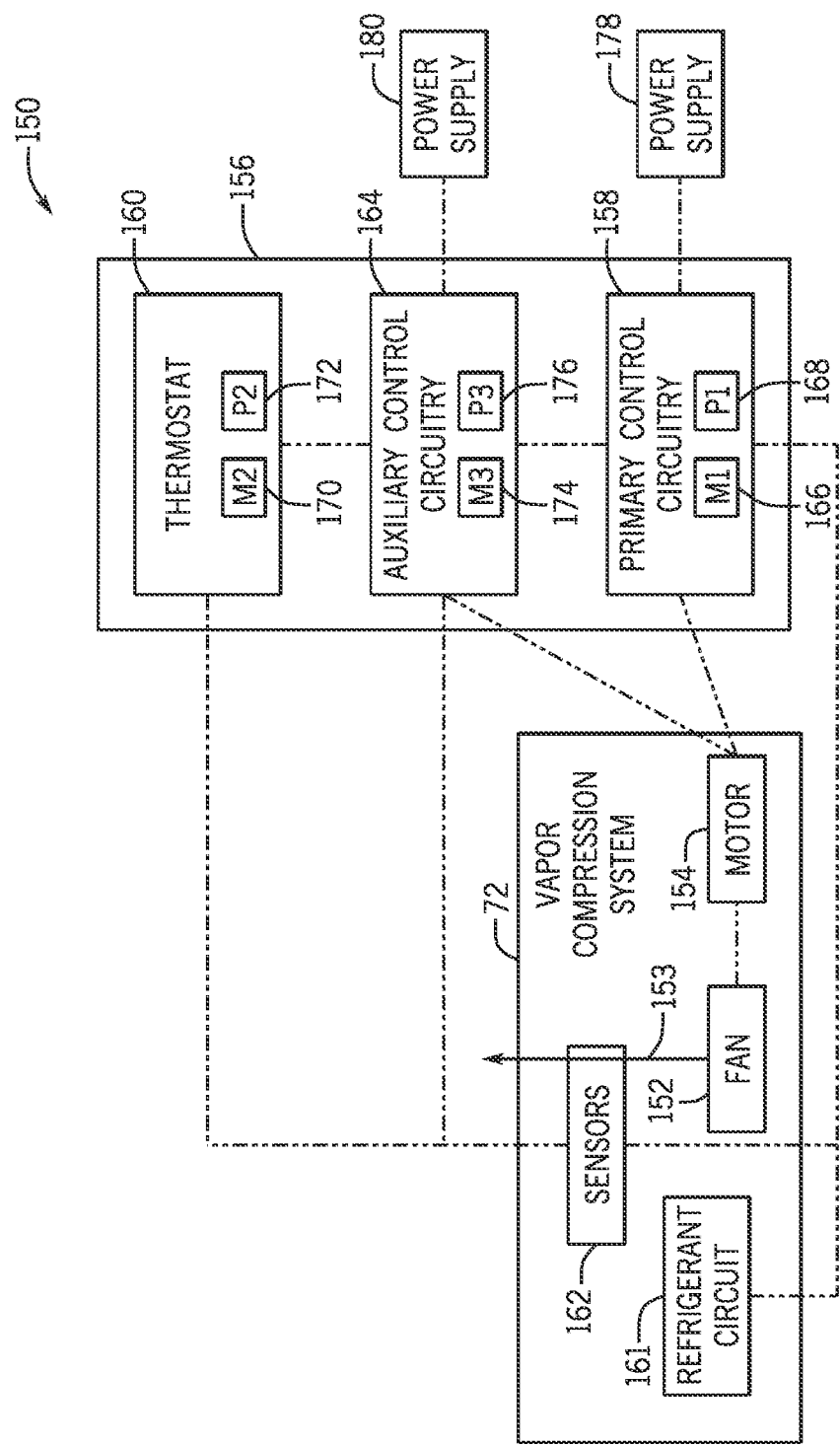
FIG. 5 a schematic diagram of an embodiment of an HVAC system with auxiliary control circuitry configured to operate the HVAC system based on a detection of a refrigerant external to the HVAC system, in accordance with an aspect of the present disclosure.

With this in mind, FIG. 5 is a schematic diagram of an embodiment of an HVAC system 150 that includes the vapor compression system 72. The vapor compression system 72 may include a fan 152 (e.g., the fans 32, the fan 64, the fan 66) configured to direct an air flow 153, as well as a motor 154 configured to operate the fan 152. In some embodiments, the motor 154 may operate the fan 152 to direct the supply air stream 98 across the evaporator 80. In additional or alternative embodiments, the motor 154 may operate the fan 152 to direct the environmental air 96 across the condenser 76.

The HVAC system 150 may include a control system 156 configured to operate the vapor compression system 72. For example, the control system 156 may include primary control circuitry 158 (e.g., a first controller, a first automation controller, a first programmable controller, an indoor unit controller) communicatively coupled to and configured to operate components of the vapor compression system 72. In certain embodiments, the primary control circuitry 158 may be configured to operate the motor 154 to drive the fan 152 to direct the air flow 153 through the vapor compression system 72. The illustrated control system 156 includes a thermostat 160, which may be configured to transmit control signals to the primary control circuitry 158 and cause the primary control circuitry 158 to operate the vapor compression system 72 and the HVAC system 150 in a primary operating mode. In the primary operating mode, the vapor compression system 72 may operate based on the control signals transmitted by the thermostat 160.

By way of example, the HVAC system 150 may include one or more sensors 162 configured to monitor operating parameters associated with the HVAC system 150, such as of a space serviced by the HVAC system 150 and/or a refrigerant circulated through the vapor compression system 72. The operating parameters may, for instance, be indicative of a temperature of air or refrigerant, a pressure of air or refrigerant, a humidity of air, an air flow rate, a refrigerant flow rate, another suitable operating parameter, or any combination thereof. The thermostat 160 may receive data from the sensor(s) 162 and output the control signals based on the data. As an example, the thermostat 160 may set a target value of the operating parameter monitored by the sensor(s) 162, such as based on a received user input. The thermostat 160 may output the control signals to cause the primary control circuitry 158 to operate the vapor compression system 72 to achieve the target value, such as by comparing values detected via the sensor(s) 162 with the target value. In an example embodiment, the thermostat 160 may determine a target temperature of the space conditioned by the HVAC system 150, receive sensor data indicative of a current temperature of the space, and transmit a control signal to cause the primary control circuitry 158 to operate a compressor (e.g., the compressor 42) based on a difference between the target temperature and the current temperature. For instance, the thermostat 160 may output a control signal indicative of a call for conditioning (e.g., a call for cooling, a call for heating) based on the difference between the target temperature and the current temperature exceeding a threshold value, and the thermostat 160 may transmit a control signal to the primary control circuitry 158 to operate the compressor (e.g., to condition a supply air flow, such as the air flow 153, via the vapor compression system 72) to satisfy the call for conditioning. In some embodiments, the primary control circuitry 158 may also be communicatively coupled to the sensor(s) 162 and may operate based on data received from the sensor(s) 162. By way of example, the data received from the sensor(s) 162 may be indicative of a flow rate and/or a pressure of the refrigerant discharged by the compressor, and the primary control circuitry 158 may operate the compressor based on the data (e.g., to achieve a target flow rate and/or a target pressure of the refrigerant).

The control system 156 may further include auxiliary control circuitry 164 (e.g., a second controller, a second automation controller, a second programmable controller) that may be configured to enable transmission of the control signals from the thermostat 160 to the primary control circuitry 158 or to interrupt the control signals being transmitted by the thermostat 160 and block receipt of the control signals at the primary control circuitry 158. In other words, the auxiliary control circuitry 164 may be configured to receive control signals from the thermostat 160 and selectively transmit or block transmission of the control signals to the primary control circuitry 158. As such, the auxiliary control circuitry 164 may block the primary control circuitry 158 from operating the vapor compression system 72 (e.g., during an existing call for conditioning) in response to the control signals transmitted by the thermostat 160. To this end, the auxiliary control circuitry 164 may be communicatively coupled to (e.g., between) the thermostat 160 and the primary control circuitry 158 to enable the auxiliary control circuitry 164 to receive the control signals transmitted by the thermostat 160 and control (e.g., enable, block) subsequent transmission of the control signals to the primary control circuitry 158. That is, the control signals transmitted by the thermostat 160 may initially be received by the auxiliary control circuitry 164 prior to subsequent receipt by the primary control circuitry 158.

In certain embodiments, the auxiliary control circuitry 164 may operate based on data indicative of a detected refrigerant, such as a refrigerant detected external to components of the vapor compression system 72 (e.g., external to a vapor compression circuit). As used herein, an "external refrigerant" may be indicative of a refrigerant that is external to a vapor compression circuit or refrigerant circuit 161 (e.g., components of the refrigerant circuit 161, such as a compressor, heat exchanger, conduit, and so forth) configured to circulate the refrigerant during operation of the HVAC system 150. For example, the external refrigerant may be refrigerant that has inadvertently escaped (e.g., leaked) from the refrigerant circuit 161. In some embodiments, external refrigerant may be detected by one of the sensors 162 (e.g., a refrigerant sensor). Additionally or alternatively, external refrigerant or potential external refrigerant may be detected based on data received from one of the sensors 162 that is configured to determine a pressure or temperature within the refrigerant circuit 161 of the vapor compression system 72.

The auxiliary control circuitry 164 may be communicatively coupled to the sensor(s) 162, may receive data from the sensor(s) 162, and may determine whether the data indicates an external refrigerant is detected. In an example, the data may include an operating parameter value, the auxiliary control circuitry 164 may compare the operating parameter value to a threshold value, and the auxiliary control circuitry 164 may determine that the data indicates detection of the external refrigerant based on the comparison (e.g., based on the operating parameter value exceeding a threshold value). In another example, the data may directly include an indication of a detected external refrigerant. For instance, one of the sensors 162 may be disposed within an air flow path of the air flow 153 and may detect whether refrigerant is present within the air flow 153 (e.g., a composition of the air flow 153). Detection that refrigerant is present within the air flow 153 may indicate detection of external refrigerant.

During an absence of an indication of detected external refrigerant or non-receipt of data indicative of detected external refrigerant, the auxiliary control circuitry 164 may enable the primary control circuitry 158 to receive the control signals transmitted by the thermostat 160. For example, the auxiliary control circuitry 164 may initially receive the control signals from the thermostat 160 and forward the received control signals to the primary control circuitry 158. In this manner, the auxiliary control circuitry 164 may enable the primary control circuitry 158 to operate based on the control signals transmitted by the thermostat 160, such as to operate the vapor compression system 72 to circulate the refrigerant and condition an air flow supplied to a conditioned space. However, in response to receiving an indication that refrigerant is detected (e.g., external to the refrigerant circuit 161 of the vapor compression system 72), the auxiliary control circuitry 164 may block subsequent transmission of certain control signals (e.g., calls for conditioning) from the thermostat 160 to the primary control circuitry 158. As such, the auxiliary control circuitry 164 may block the primary control circuitry 158 from operating the vapor compression system 72 in response to the control signals output by the thermostat 160. By way of example, blocking operation of the vapor compression system 72 based on the control signals may block circulation of the refrigerant through the vapor compression system 72 (e.g., through the refrigerant circuit 161), thereby reducing the potential of refrigerant escaping the refrigerant circuit 161.

In some embodiments, in response to a detection of external refrigerant, the auxiliary control circuitry 164 may transmit an additional control signal to the primary control circuitry 158 to operate the vapor compression system 72 and the HVAC system 150 in an alternative operating mode. In the alternative operating mode, the vapor compression system 72 may operate based on the additional control signals selectively transmitted by the auxiliary control circuitry 164 instead of the initial control signals transmitted by the thermostat 160 (e.g., and forwarded by the auxiliary control circuitry 164). For example, the additional control signals, such as a series of pulsated control signals, transmitted by the auxiliary control circuitry 164 may cause the primary control circuitry 158 to drive the motor 154 to operate the fan 152 to direct the air flow 153. For instance, operation of the fan 152 may dissipate the external refrigerant and/or discharge the external refrigerant from the vapor compression system 72 and further reduce the presence of the external refrigerant (e.g., near the vapor compression system 72). In embodiments in which the fan 152 is configured to direct the air flow 153 to the space conditioned by the HVAC system 150, dampers within the ductwork of the HVAC system 150 may also be adjusted (e.g., via control signals output by the primary control circuitry 158, via control signals output by the auxiliary control circuitry 164) to block the fan 152 from directing the air flow 153 to the space and to discharge the air flow 153 to an ambient or external environment. Furthermore, in embodiments in which the fan 152 is a variable speed fan, the control signals transmitted by the auxiliary control circuitry 164 may cause the fan 152 to operate at a high operating speed (e.g., a maximum rated speed, a maximum allowable speed, an upper speed limit) to dissipate the external refrigerant.

Moreover, in the alternative operating mode, the additional control signal transmitted by the primary control circuitry 158 may suspend operation of certain components of the refrigerant circuit 161. As an example, a compressor (e.g., the compressor 32) may be suspended to block circulation of the refrigerant through the refrigerant circuit 161. As another example, heating components (e.g., the furnace system 70, a heating coil) and/or cooling components (e.g., the evaporator 38) may be suspended to block heat exchange with the refrigerant. Thus, the additional control signal may mitigate effects of the refrigerant external to the refrigerant circuit 161.

The primary control circuitry 158 may be configured to identify the control signals received from the auxiliary control circuitry 164 and determine that external refrigerant is detected based on the received control signals. In addition to operating the vapor compression system 72 in the alternative operating mode (e.g., operating the fan 152) in response to detection of the refrigerant, the primary control circuitry 158 may be configured to output an indication of the detection of the refrigerant external to the refrigerant circuit 161. By way of example, the primary control circuitry 158 may output a notification to a user device (e.g., a mobile phone, a table, a laptop computer, a desktop computer), output a visual indication (e.g., a light, a display message), output an audio indication (e.g., a sound), and/or output another suitable notification to a user, operator, and/or administrator of the HVAC system 150.

Each of the primary control circuitry 158, the thermostat 160, and the auxiliary control circuitry 164 may include a respective memory and processing circuitry to enable respective operations. That is, the primary control circuitry 158 may include a first memory 166 and first processing circuitry 168, the thermostat 160 may include a second memory 170 and second processing circuitry 172, and the auxiliary control circuitry 164 may include a third memory 174 and third processing circuitry 176. Each of the memories 166, 170, 174 may include a non-transitory, computer-readable medium that may include volatile memory, such as random-access memory (RAM), and/or non-volatile memory, such as read-only memory (ROM), flash memory, optical drives, hard disc drives, solid-state drives, or any other suitable non-transitory computer-readable medium storing instructions that, when executed by the respective processing circuitry 168, 172, 176, may control operation of the HVAC system 150. To this end, each of the processing circuitries 168, 172, 176 may include one or more application specific integrated circuits (ASICs), one or more field programmable gate arrays (FPGAs), one or more programmable logic devices (PLD), one or more programmable logic arrays (PLA), one or more general purpose processors, or any combination thereof configured to execute such instructions.

Different HVAC systems 150 may have different embodiments of the control system 156. In some embodiments, the thermostat 160 may be a conventional (e.g., non-communicating) thermostat configured to unidirectionally communicate to enable operation or suspend operation of the vapor compression system 72 via the primary control circuitry 158. That is, thermostat 160 may be configured to transmit a control signal (e.g., a voltage) to the primary control circuitry 158 to enable operation of the vapor compression system 72 but may not be configured to receive a control signal from the primary control circuitry 158 and operate based on the received control signal. In additional embodiments, the thermostat 160 may be a communicating thermostat that enables bi-direction communication between the thermostat 160 and other components of the HVAC system 150. For instance, the thermostat 160 may be configured to receive control signals transmitted from the primary control circuitry 158 and/or the other components and operate based on the received control signals. In further embodiments, the thermostat 160 may be configured to transmit (e.g., directly transmit) control signals to one or more components of the HVAC system 150, such as the motor 154, without the primary control circuitry 158. Indeed, some embodiments of the HVAC system 150 may not include the primary control circuitry 158, and the motor 154 may be configured to receive the control signals transmitted from the thermostat 160 and operate based on the received control signals. Accordingly, different embodiments of the control system 156 may include different embodiments of the thermostat 160 and/or different communicative coupling between the thermostat 160, the primary control circuitry 158, and/or the vapor compression system 72.

However, in accordance with the present techniques, an embodiment of the auxiliary control circuitry 164 may be implemented in each of the different embodiments of the control system 156 and enable operation of the vapor compression system 72 in the primary operating mode and the alternative operating mode. That is, the auxiliary control circuitry 164 may readily couple to a conventional thermostat and to the primary control circuitry 158 to enable transmission of control signals from the conventional thermostat to the primary control circuitry 158 and/or to interrupt transmission of the control signals from the conventional thermostat to the primary control circuitry 158. The auxiliary control circuitry 164 may also readily couple to a communicating thermostat and to the primary control circuitry 158 to enable transmission of control signals from the communicating thermostat to the primary control circuitry 158 and/or to interrupt transmission of the control signals from the communicating thermostat to the primary control circuitry 158. The auxiliary control circuitry 164 may further readily couple to the thermostat 160 and to the motor 154 to enable transmission of control signals from the thermostat 160 to the motor 154 and/or to interrupt transmission of the control signals from the thermostat 160 to the motor 154. As such, the auxiliary control circuitry 164 may enable any of the embodiments of the control system 156 to operate the vapor compression system 72 in the primary operating mode and in the alternative operating mode based on whether a refrigerant is detected (e.g., external to the refrigerant circuit 161).

In some embodiments, the primary control circuitry 158 may include a first control board, and the auxiliary control circuitry 164 may include a second control board, which may be physically separate from the first control board. In additional or alternative embodiments, the primary control circuitry 158 and the auxiliary control circuitry 164 may be physically positioned on the same medium. For example, the primary control circuitry 158 and the auxiliary control circuitry 164 (e.g., respective processor chips) may be attached to the same control board. In either case, the auxiliary control circuitry 164 may be configured to communicatively couple to the thermostat 160 (e.g., via wires) and to either the primary control circuitry 158 or to the motor 154 (e.g., via additional wires) to communicatively couple the motor 154, the primary control circuitry 158, and/or the thermostat 160 to one another. The primary control circuitry 158 and the auxiliary control circuitry 164 may also be configured to receive power from different power supplies. For example, the primary control circuitry 158 may be configured to receive power from a first power supply 178, and the auxiliary control circuitry 164 may be configured to receive power from a second power supply 180. As such, the coupling between the primary control circuitry 158 and the first power supply 178 may not be modified to accommodate implementation or installation of the auxiliary control circuitry 164 (e.g., to couple the first power supply 178 to the auxiliary control circuitry 164 in addition to the primary control circuitry 158). However, in additional or alternative embodiments, the primary control circuitry 158 and the auxiliary control circuitry 164 may be configured to receive power from the same power supply.

In certain embodiments, each of the primary control circuitry 158 and the auxiliary control circuitry 164 may be physically proximate to one another. By way of example, in embodiments in which the fan 152 is configured to drive the supply air stream 98 across the evaporator 80, each of the fan 152, the primary control circuitry 158, and the auxiliary control circuitry 164 may be located at or within an indoor unit of the HVAC system 150. Positioning the primary control circuitry 158 and the auxiliary control circuitry 164 proximate to one another may facilitate ease of coupling (e.g., communicative coupling) between the primary control circuitry 158 and the auxiliary control circuitry 164. However, in additional or alternative embodiments, the primary control circuitry 158 and the auxiliary control circuitry 164 may not be positioned proximate to one another. For example, the primary control circuitry 158 may be positioned at or within an indoor unit of the HVAC system 150, and the auxiliary control circuitry 164 may be positioned at or within an outdoor unit of the HVAC system 150. In further embodiments, the auxiliary control circuitry 164 may be configured to communicatively couple with additional control circuitry other than the primary control circuitry 158, and the additional control circuitry may not be proximate to the primary control circuitry 158 and/or the auxiliary control circuitry 164.

Figure 6:
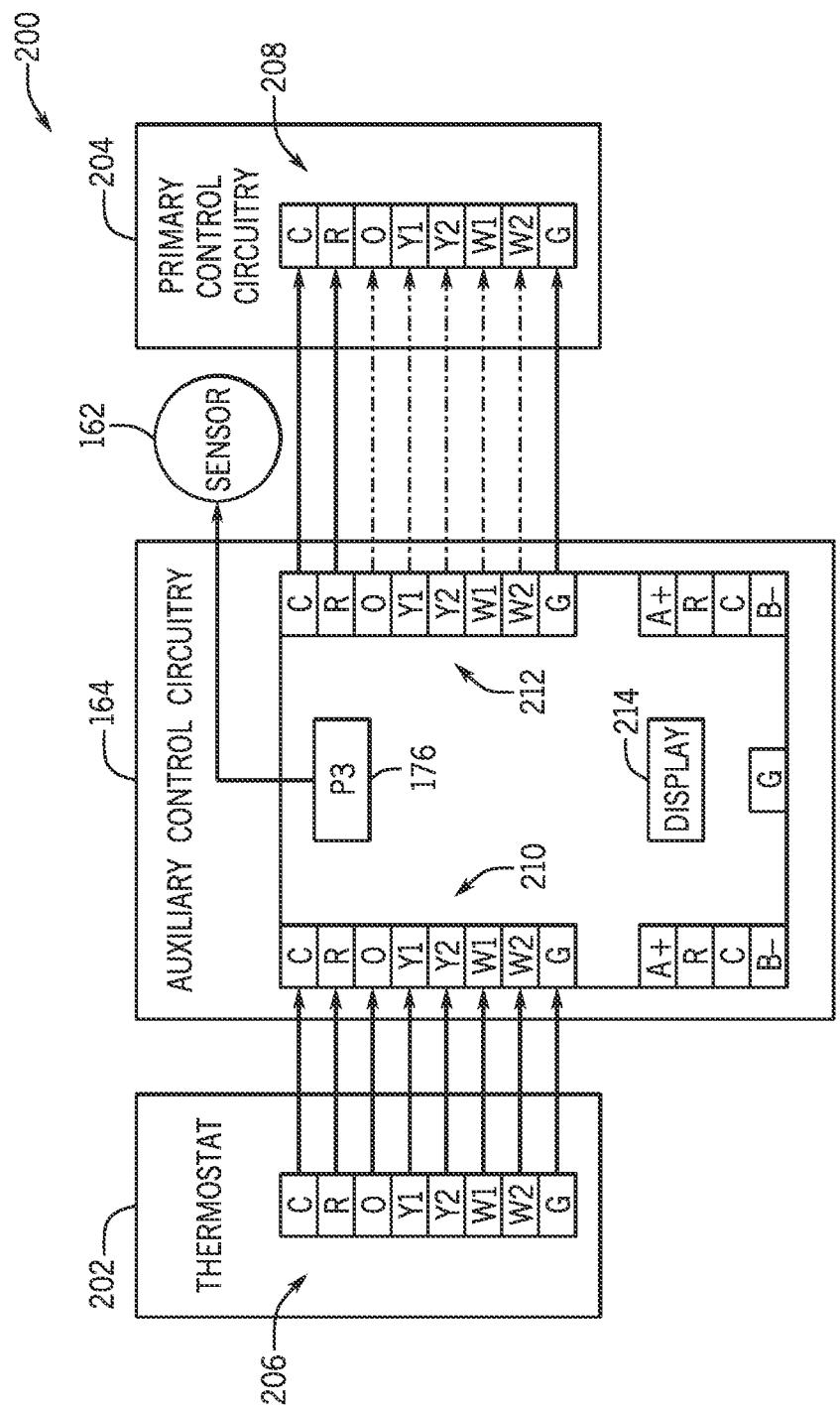
FIG. 6 is a schematic diagram of an embodiment of a control system of an HVAC system with auxiliary control circuitry configured to operate the HVAC system based on a detection of a refrigerant external to the HVAC system, in accordance with an aspect of the present disclosure.

FIG. 6 is a schematic diagram of an embodiment of a control system 200 (e.g., the control system 156) of the HVAC system 150 that includes the auxiliary control circuitry 164, a conventional thermostat 202 (e.g., the thermostat 160), and primary control circuitry 204 (e.g., the primary control circuitry 158) communicatively coupled to one another. The primary control circuitry 204 may be specifically modified, designed, or manufactured to communicate with the conventional thermostat 202. For example, the conventional thermostat 202 may include first thermostat connector ports 206 via which the conventional thermostat 202 may transmit control signals, and the primary control circuitry 204 may include corresponding first primary connector ports 208 via which the primary control circuitry 204 may receive the control signals transmitted by the conventional thermostat 202. Indeed, each of the first thermostat connector ports 206 may be communicatively coupled to a corresponding one of the first primary connector ports 208 (e.g., via the auxiliary control circuitry 164) to enable transmission of the control signals from the conventional thermostat 202 to the primary control circuitry 204. Each of the first thermostat connector ports 206 may also be configured to communicatively couple to a corresponding one of the first primary connector ports 208 without the auxiliary control circuitry 164.

The auxiliary control circuitry 164 may communicatively couple the conventional thermostat 202 and the primary control circuitry 204 to one another, as mentioned above. For example, the auxiliary control circuitry 164 may include first auxiliary connector ports 210 (e.g., first conventional thermostat connector ports) configured to communicatively couple to (e.g., via wires) the first thermostat connector ports 206 of the conventional thermostat 202. The auxiliary control circuitry 164 may also include second auxiliary connector ports 212 (e.g., second conventional thermostat connector ports) configured to communicatively couple to (e.g., via wires) the first primary connector ports 208 of the primary control circuitry 204. The first auxiliary connector ports 210 and the second auxiliary connector ports 212 may be communicatively coupled to one another, such as via the third processing circuitry 176, to enable transmission of control signals between the first auxiliary connector ports 210 and the second auxiliary connector ports 212. By way of example, the auxiliary control circuitry 164 may operate in a first configuration (e.g., a transmission configuration) configured to enable transmission of the control signals from the conventional thermostat 202 to the primary control circuitry 204 via the first auxiliary connector ports 210 and the second auxiliary connector ports 212. For instance, in the first configuration, the auxiliary control circuitry 164 may receive control signals transmitted by the conventional thermostat 202 via the first auxiliary connector ports 210. The control signals received from the conventional thermostat 202 may be transmitted from the first auxiliary connector ports 210 to the second auxiliary connector ports 212, and the auxiliary control circuitry 164 may transmit the control signals to the primary control circuitry 204 via the second auxiliary connector ports 212. As such, the auxiliary control circuitry 164 may enable the primary control circuitry 204 to operate the vapor compression system 72 based on the control signals (e.g., calls for conditioning) transmitted by the conventional thermostat 202.

The auxiliary control circuitry 164 may also operate in a second configuration (e.g., a blocking configuration, a fault configuration, a detected refrigerant configuration) configured to block transmission of certain control signals (e.g., calls for conditioning) from the conventional thermostat 202 to the primary control circuitry 204. For instance, in the second configuration, the auxiliary control circuitry 164 may receive the control signals transmitted by the conventional thermostat 202 via the first auxiliary connector ports 210, but the third processing circuitry 176 may block transmission of the control signals to the primary control circuitry 204 via the second auxiliary connector ports 212. As an example, the third processing circuitry 176 may communicatively decouple the first auxiliary connector ports 210 and the second auxiliary connector ports 212 from one another, thereby interrupting transmission of the control signals from the first auxiliary connector ports 210 to the second auxiliary connector ports 212, thereby blocking subsequent transmission of the control signals to the primary control circuitry 204 via the second auxiliary connector ports 212. Thus, in the second configuration, the auxiliary control circuitry 164 may block the primary control circuitry 204 from operating the vapor compression system 72 based on the control signals (e.g., calls for conditioning) transmitted by the conventional thermostat 202.

The auxiliary control circuitry 164 may transition between the first configuration and the second configuration based on data received from the sensor(s) 162. By way of example, in response to absence of an indication of detected refrigerant external to the refrigerant circuit 161 indicated by the data received from the sensor(s) 162, the auxiliary control circuitry 164 may operate in the first configuration to enable transmission of control signals from the conventional thermostat 202 to the primary control circuitry 204. In response to a refrigerant detection indicated by the data received from the sensor(s) 162, the auxiliary control circuitry 164 may operate in the second configuration to block transmission of control signals from the conventional thermostat 202 to the primary control circuitry 204. In some embodiments, in the second configuration, the auxiliary control circuitry 164 may transmit an additional or alternative control signal to the primary control circuitry 204 via one of the second auxiliary connector ports 212. The additional or alternative control signal may cause the primary control circuitry 204 to operate the vapor compression system 72 in the alternative operating mode, such as to operate the fan 152 to direct the air flow 153 through the vapor compression system 72 and/or suspend operation of certain components of the vapor compression system 72 (e.g., a compressor, heating elements).

The auxiliary control circuitry 164 may also include a display 214 configured to output an indication, such as a visual indication, associated with operation of the HVAC system 150. For example, the auxiliary control circuitry 164 may output an indication of the operating mode (e.g., the primary operating mode, the alternative operating mode) of the vapor compression system 72, the configuration (e.g., the first configuration, the second configuration) of the auxiliary control circuitry 164, whether a refrigerant is detected external to the refrigerant circuit 161, other suitable information, or any combination thereof. Thus, the display 214 may inform a user (e.g., an operator, a technician, a customer, an administrator) regarding a status of the HVAC system 150 to enable the user to perform an appropriate action with respect to the HVAC system 150.

Figure 7:
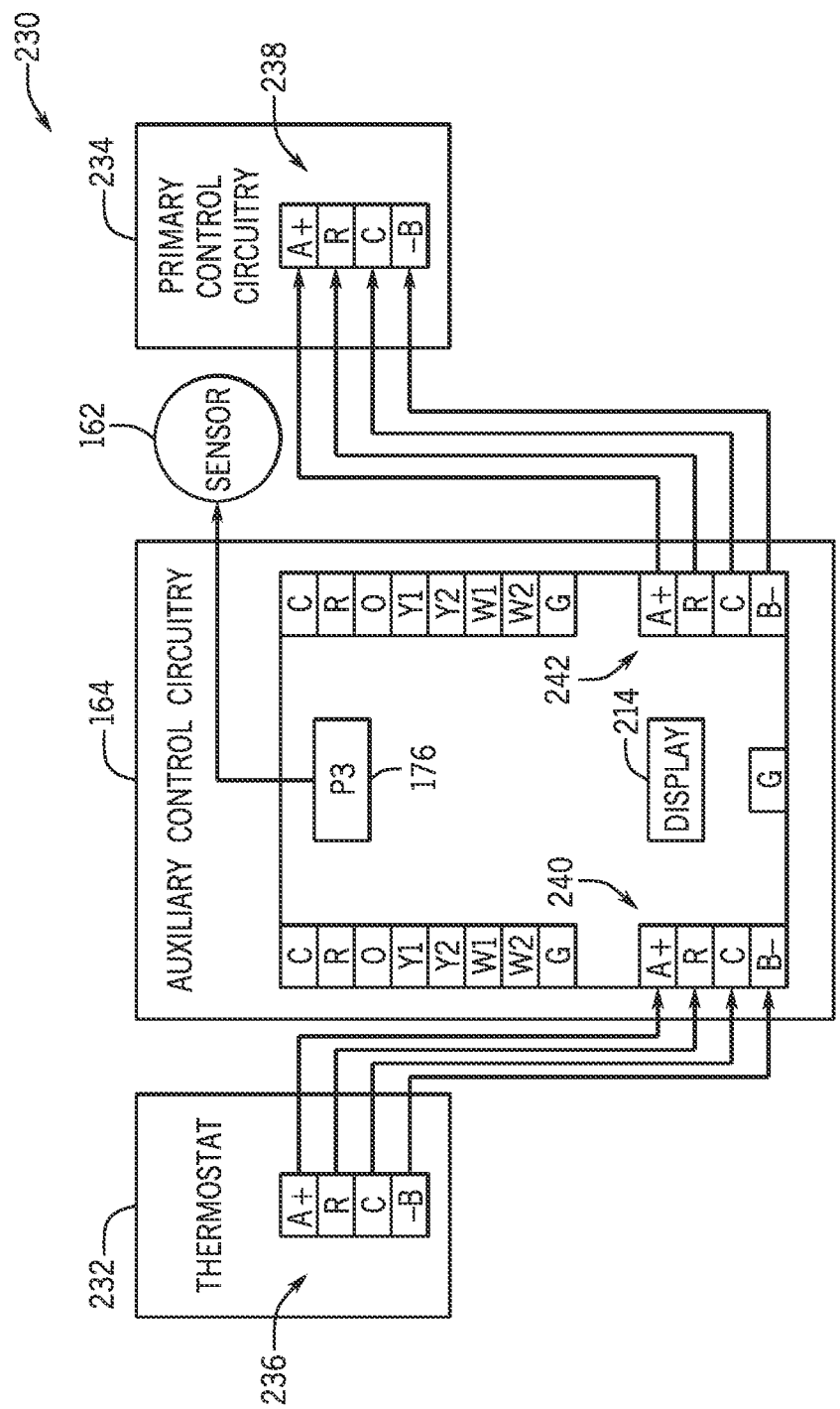
FIG. 7 is a schematic diagram of an embodiment of a control system of an HVAC system with auxiliary control circuitry configured to operate the HVAC system based on a detection of a refrigerant external to the HVAC system, in accordance with an aspect of the present disclosure.

FIG. 7 is a schematic diagram of an embodiment of a control system 230 (e.g., the control system 156) of the HVAC system 150 that includes the auxiliary control circuitry 164, a communicating thermostat 232 (e.g., the thermostat 160), and primary control circuitry 234 (e.g., the primary control circuitry 158) communicatively coupled to one another. The primary control circuitry 234 may be specifically modified, designed, or manufactured to communicate with the communicating thermostat 232 (e.g., rather than the conventional thermostat 202). For example, the communicating thermostat 234 may include second thermostat connector ports 236 via which the communicating thermostat 232 may transmit and/or receive control signals, and the primary control circuitry 234 may include second primary connector ports 238 via which the primary control circuitry 234 may transmit and/or receive control signals. For instance, each of the second thermostat connector ports 236 may be communicatively coupled to a corresponding one of the second primary connector ports 238 to enable bi-directional communication of control signals between the communicating thermostat 232 and the primary control circuitry 234 (e.g., directly or via the auxiliary control circuitry 164).

The auxiliary control circuitry 164 may communicatively couple the communicating thermostat 232 and the primary control circuitry 234 to one another. To this end, the auxiliary control circuitry 164 may include third auxiliary connector ports 240 (e.g., first communicating connector ports) configured to communicatively couple to (e.g., via wires) the second thermostat connector ports 236 of the communicating thermostat 232. The auxiliary control circuitry 164 may also include fourth auxiliary connector ports 242 (e.g., second communicating connector ports) configured to communicatively couple to (e.g., via wires) the second primary connector ports 238 of the primary control circuitry 234. The third auxiliary connector ports 240 and the fourth auxiliary connector ports 242 may be communicatively coupled to one another via the third processing circuitry 176 to enable transmission of control signals between the third auxiliary connector ports 240 and the fourth auxiliary connector ports 242.

The illustrated auxiliary control circuitry 164 may also transition between the first configuration, which may enable transmission of the control signals between the communicating thermostat 232 and the primary control circuitry 234, and the second configuration, which may block transmission of the control signals between the communicating thermostat 232 and the primary control circuitry 234, based on data received from the sensor(s) 162 (e.g., data indicative of a detected refrigerant). Indeed, in the first configuration, the auxiliary control circuitry 164 may receive control signals transmitted by the communicating thermostat 232 via the third auxiliary connector ports 240. The control signals received from the communicating thermostat 232 may be transmitted from the third auxiliary connector ports 242 to the fourth auxiliary connector ports 242, and the auxiliary control circuitry 164 may transmit the control signals to the primary control circuitry 234 via the fourth auxiliary connector ports 242. Additionally or alternatively, in the first configuration, the auxiliary control circuitry 164 may receive control signals from the primary control circuitry 234 via the fourth auxiliary connector ports 242. The control signals received from the primary control circuitry 234 may be transmitted from the fourth auxiliary connector ports 242 to the third auxiliary connector ports 240, and the auxiliary control circuitry 164 may transmit the control signals to the communicating thermostat 232 via the third auxiliary connector ports 240. Thus, in the first configuration, the auxiliary control circuitry 164 may enable the primary control circuitry 234 to operate the vapor compression system based on the control signals transmitted by the communicating thermostat 232 and/or enable the communicating thermostat 232 to operate based on the control signals transmitted by the primary control circuitry 234.

In the second configuration, the auxiliary control circuitry 164 may block transmission of certain control signals (e.g., calls for conditioning) from the communicating thermostat 232 to the primary control circuitry 234. By way of example, in the second configuration, the auxiliary control circuitry 164 may receive the control signals from the communicating thermostat 232 via the third auxiliary connector ports 240, but the third processing circuitry 176 may block subsequent transmission of the control signals to the primary control circuitry 234 via the fourth auxiliary connector ports 242, such as by interrupting transmission of the control signals from the third auxiliary connector ports 240 to the fourth auxiliary connector ports 242. Thus, in the second configuration, the auxiliary control circuitry 164 may block the primary control circuitry 204 from operating the vapor compression system 72 based on the control signals (e.g., calls for conditioning) transmitted by the communicating thermostat 232. Additionally or alternatively, in the second configuration, the auxiliary control circuitry 164 may block transmission of certain control signals from the primary control circuitry 234 to the communicating thermostat 232, such as by blocking transmission of the control signals from the fourth auxiliary connector ports 242 to the third auxiliary connector ports 240. As such, the auxiliary control circuitry 164 may block operation of the communicating thermostat 232 based on the control signals transmitted by the primary control circuitry 234 in the second configuration. In the second configuration, the auxiliary control circuitry 164 may also transmit an additional control signal to the primary control circuitry 234 via one of the fourth auxiliary connector ports 242 to cause the primary control circuitry 204 to operate the vapor compression system 72 in the alternative operating mode.

In further embodiments, the auxiliary control circuitry 164 may also transmit control signals to the communicating thermostat 232 in the first configuration and/or the second configuration. For example, the control signals transmitted by the auxiliary control circuitry 164 may cause the communicating thermostat 232 to output information, such as information indicating whether a refrigerant is detected external to the refrigerant circuit 161 (e.g., during operation of the auxiliary control circuitry 164 in the second configuration) and/or information associated with an operation (e.g., an operating mode) of the HVAC system 150. Thus, the auxiliary control circuitry 164 may also be configured to control operation of the communicating thermostat 232.

Figure 8:
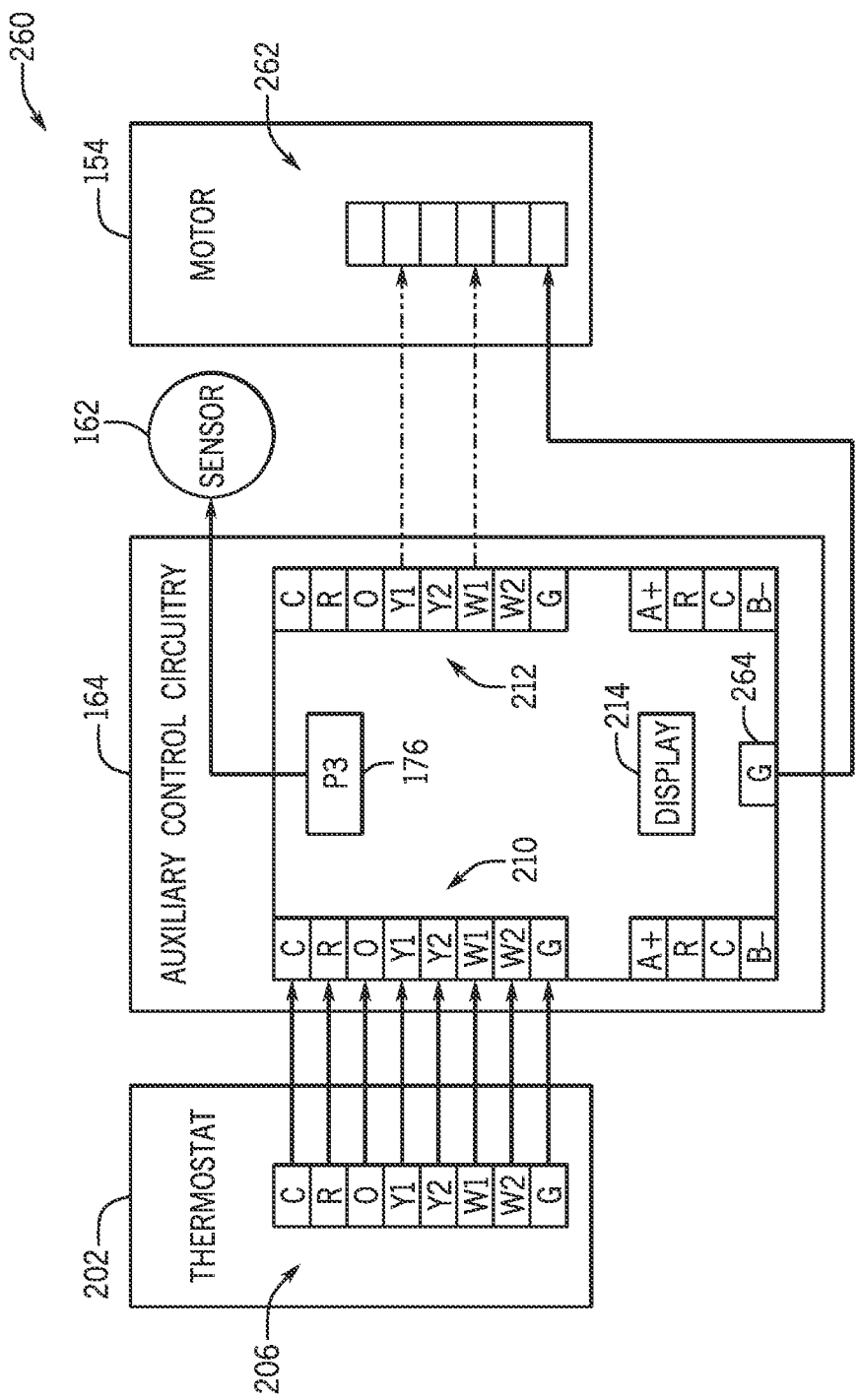
FIG. 8 is a schematic diagram of an embodiment of a control system of an HVAC system with auxiliary control circuitry configured to operate the HVAC system based on a detection of a refrigerant external to the HVAC system, in accordance with an aspect of the present disclosure.

FIG. 8 is a schematic diagram of an embodiment of a control system 260 (e.g., the control system 156) of the HVAC system 150 that includes the auxiliary control circuitry 164, the conventional thermostat 202, and the motor 154 (e.g., speed tap circuitry of the motor 154) communicatively coupled to one another. The illustrated control system 260 does not include primary control circuitry (e.g., the primary control circuitry 158). Thus, the motor 154 (e.g., a VSD of the motor, control circuitry of the motor) may be configured to receive the control signals transmitted by the conventional thermostat 202 (e.g., directly or via the auxiliary circuitry 164). By way of example, the motor 154 may include input connector ports 262 configured to receive the control signals from the conventional thermostat 202, and the motor 154 may operate based on the received control signals. Although the auxiliary control circuitry 164 is configured to communicatively couple to the motor 154 in the illustrated embodiment of the control system 260, in additional or alternative embodiments, the auxiliary control circuitry 164 may be configured to communicatively couple to a different component of the HVAC system 150, such as a compressor (e.g., the compressor 74), to enable the other component to receive the control signals transmitted by the conventional thermostat 202.

The auxiliary control circuitry 164 may communicatively couple the conventional thermostat 202 and the motor 154 to one another. For instance, the auxiliary control circuitry 164 may be configured to couple to the conventional thermostat 202 via the first auxiliary connector ports 210, and the auxiliary control circuitry 164 may include a fifth auxiliary connector port 264 (e.g., a motor connector port) configured to communicatively couple to (e.g., via wires) one or more of the input connector ports 262 of the motor 154. The first auxiliary connector ports 210 and the fifth auxiliary connector port 264 may be communicatively coupled to one another via the third processing circuitry 176 to enable transmission of control signals between the first auxiliary connector ports 210 and the fifth auxiliary connector port 264.

In the first configuration (e.g., when the data received from the sensor(s) 162 do not indicate a detected refrigerant), the auxiliary control circuitry 164 may enable transmission of the control signals from the conventional thermostat 202 to the motor 154. As an example, the auxiliary control circuitry 164 may receive the control signals from the conventional thermostat 202 via the first auxiliary connector ports 210. The control signals received from the conventional thermostat 202 may be transmitted from the first auxiliary connector ports 210 to the fifth auxiliary connector port 264, and the auxiliary control circuitry 164 may transmit the control signals to the motor 154 via the fifth auxiliary connector port 264 to enable the motor 154 to operate based on the control signals (e.g., calls for conditioning) transmitted by the conventional thermostat 202. In the second configuration (e.g., when the data received from the sensor(s) 162 indicate a refrigerant is detected external to the refrigerant circuit 161), the auxiliary control circuitry 164 may block transmission of certain control signals (e.g., calls for conditioning) from the conventional thermostat 202 to the motor 154, such as by interrupting transmission of the control signals from the first auxiliary connector ports 210 to the fifth auxiliary connector port 264. As such, the auxiliary control circuitry 164 may block operation of the motor 154 based on certain control signals (e.g., calls for conditioning) transmitted by the conventional thermostat 202. The auxiliary control circuitry 164 may also selectively transmit an additional control signal to the motor 154 via the fifth auxiliary port 264 in the second configuration. Thus, the auxiliary control circuitry 164 may directly control operation of the motor 154 to operate the vapor compression system 72 in the alternative operating mode.

It should be noted that the same embodiment of the auxiliary control circuitry 164 may be incorporated in the different control systems 200, 230, 260. That is, an embodiment of the auxiliary control circuitry 164 may include the first auxiliary connector ports 210, the second auxiliary connector ports 212, the third auxiliary connector ports 240, the fourth auxiliary connector ports 242, and the fifth auxiliary connector port 264. As such, the auxiliary control circuitry 164 may readily couple to the conventional thermostat 202, the communicating thermostat 232, the primary control circuitry 204, the primary control circuitry 234, and the motor 154, depending on the embodiment of the HVAC system 150 with which the auxiliary control circuitry 164 is implemented. In this manner, the same embodiment of the auxiliary control circuitry 164 may be readily implemented in any of the control systems 200, 230, 260 to enable operation of the vapor compression system 72 based on a detected refrigerant, such as in the primary operating mode and in the alternative operating mode. That is, a single embodiment of the auxiliary control circuitry 164 may be manufactured and implemented in different embodiments of the control system 156, thereby reducing a cost and/or complexity associated with controlling operation of the HVAC system 150 based on the detected refrigerant (e.g., external to the refrigerant circuit 161). Indeed, the auxiliary control circuitry 164 may obviate manufacture, design, or modification of dedicated control circuitry (e.g., a particular embodiment of the primary control circuitry 164, 204, 234, a particular embodiment of additional control circuitry) to enable operation of the HVAC system 150 based on detections of refrigerant external to the refrigerant circuit 161.

Each of FIGS. 9 and 10 described below illustrates a respective method or process for operating the HVAC system 150. In some embodiments, each method may be performed by a single component or system, such as the first processing circuitry 168 of the primary control circuitry 158 or the third processing circuitry 176 of the auxiliary control circuitry 164. In additional or alternative embodiments, multiple components or systems may perform the steps for each of the methods. It should also be noted that additional steps may be performed with respect to each depicted method. Moreover, certain steps of each depicted method may be removed, modified, and/or performed in a different order. Further still, the respective steps for each of the methods may be performed in any suitable relation with one another, such as in response to one another and/or in parallel with one another.

Figure 9:
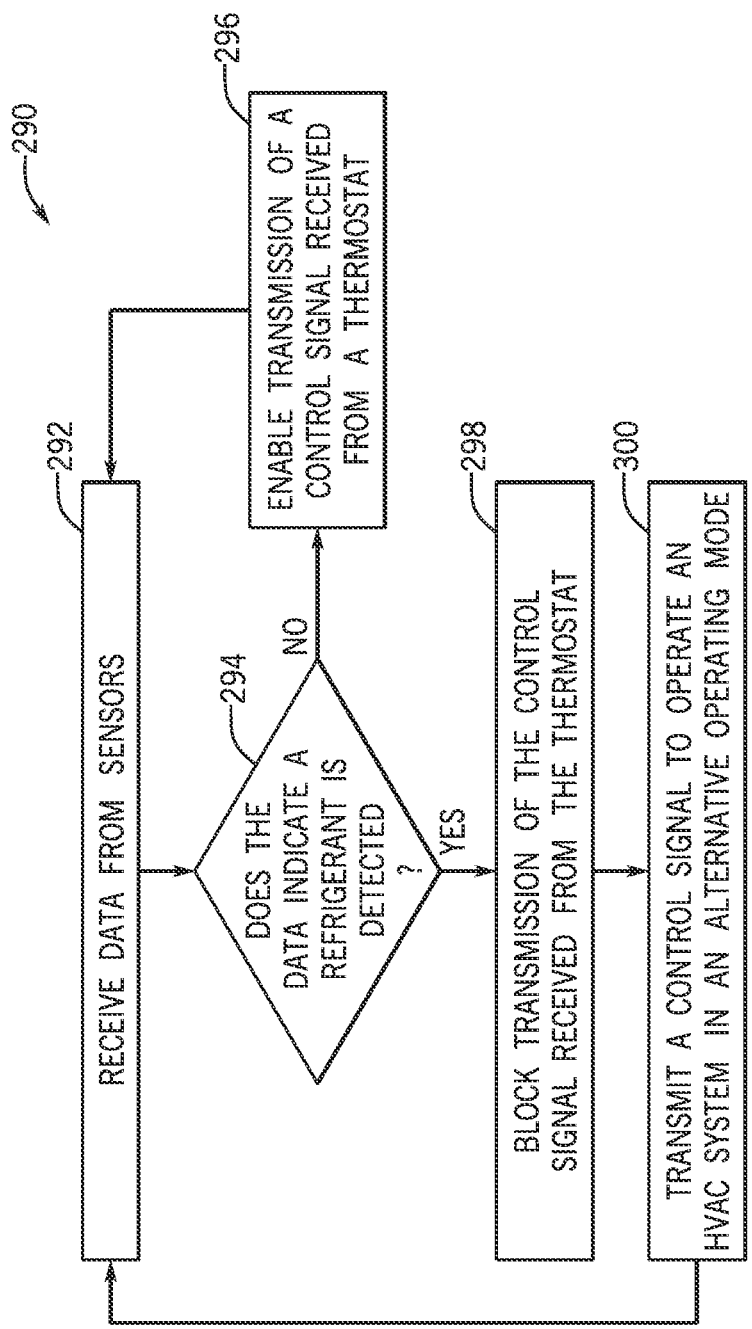
FIG. 9 is a flowchart of an embodiment of a method for operating an HVAC system based on a detection of a refrigerant external to the HVAC system, in accordance with an aspect of the present disclosure.

FIG. 9 is a flowchart of an embodiment of a method 290 for operating the HVAC system 150. In some embodiments, the method 290 may be performed by the auxiliary control circuitry 158 incorporated with any of the control systems 156, 200, 230, 260 described above. At block 292, data may be received from the sensor(s) 162. At block 294, a determination may be made regarding whether the received data indicates a refrigerant is detected (e.g., external to the refrigerant circuit 161). In some embodiments, the data may include an operating parameter value, and the operating parameter value may be analyzed (e.g., compared to a threshold value) to determine whether the data indicates a refrigerant (e.g., an external refrigerant) is detected. In additional or alternative embodiments, the data may directly indicate whether there is a detection of a refrigerant. At block 296, in response to a determination that the received data does not indicate a refrigerant detection, a control signal received from the thermostat 160 (e.g., the conventional thermostat 202, the communicating thermostat 232) may be subsequently transmitted, such as via operation of the auxiliary control circuitry 164 in the first configuration. As an example, the control signal received from the thermostat 160 may be subsequently transmitted to the primary control circuitry 158 (e.g., the primary control circuitry 204, the primary control circuitry 234). As another example, the control signal received from the thermostat 160 may be subsequently transmitted to the motor 154 or another component of the HVAC system 150. Thus, the HVAC system 150, such as the vapor compression system 72, may be operated (e.g., in the primary operating mode) based on the control signal transmitted by the thermostat 160. For instance, the control signal may include a call for conditioning that causes the vapor compression system 72 to circulate the refrigerant through the refrigerant circuit 161 to condition an air flow in order to satisfy the call for conditioning.

However, at block 298, in response to a determination that the received data indicates a refrigerant is detected, a control signal received from the thermostat 160 may be blocked from subsequent transmission, such as via operation of the auxiliary control circuitry 164 in the second configuration. Thus, operation of the HVAC system 150 (e.g., the vapor compression system 72) based on the control signal transmitted by the thermostat 160 may be blocked. For example, a call for conditioning transmitted by the thermostat 160 may be blocked, and the vapor compression system 72 therefore may not operate to circulate the refrigerant through the refrigerant circuit 161. At block 300, a control signal may be selectively transmitted to operate the HVAC system 150 in the alternative operating mode. For example, the control signal may cause the fan 152 to operate to direct the air flow 153 to dissipate the detected refrigerant (e.g., direct the refrigerant to an ambient environment) and/or to suspend operation of certain components of the vapor compression system 72. The control signals may be transmitted in a particular manner that may be recognized by a recipient component (e.g., the primary control circuitry 158) as an indication to operate the vapor compression system 72 in the alternative operating mode. For example, the control signals may include a series of pulsating control signals (e.g., a pulsating "G" signal, a pulsating control signal to operate the fan 152), which may include signals that are transmitted at a set frequency, such as alternating between 0.5 seconds of signal transmission and 0.5 seconds of no signal transmission. In the alternative operating mode, an additional or alternative control signal may be output to indicate a detection of refrigerant. The indication may include, for example, a visual output, an audio output, a message, or any suitable indication that may inform the user of the detected refrigerant and prompt the user to address the refrigerant detection. Further still, in embodiments in which the thermostat 160 is the communicating thermostat 232, an additional control signal may be transmitted to the thermostat 160 to cause the thermostat 160 to output an indication, such as a display, of the detected refrigerant.

In some embodiments, the data may be continually received from the sensor(s) 162, and a determination may made for each instance of received data regarding whether a refrigerant detection is indicated. As an example, the control signals received from the thermostat 160 may continue to be subsequently transmitted by the auxiliary control circuitry 164 so long as a refrigerant detection is not indicated by the data received from the sensor(s) 162. As another example, subsequent transmission of the control signals received from the thermostat 160 may continue to be blocked by the auxiliary control circuitry 164 so long as a refrigerant detection is indicated by the data received from the sensor(s) 162. Additionally, the control signals to operate the HVAC system 150 in the alternative operating mode may continue to be transmitted by the auxiliary control circuitry 164 so long as a refrigerant detection is indicated. In certain embodiments, the control signals to operate the HVAC system 150 in the alternative operating mode may be transmitted by the auxiliary control circuitry 164 until a threshold period of time (e.g., 10 minutes, 30 minutes, 1 hour, more than 1 hour) since last detection of the refrigerant has elapsed. To this end, after a determination that the received data is indicative of a refrigerant detection, a timer may be initiated to monitor a duration of time for which the refrigerant detection has been indicated (e.g., continually or continuously indicated). After the monitored duration of time has exceeded the threshold period of time, thereby indicating a prolonged duration for which a refrigerant detection may be occurring, operation of the HVAC system 150 (e.g., in either the alternative operating mode or the primary operating mode) may be suspended. During suspended operation of the HVAC system 150, the HVAC system 150 (e.g., including the fan 152) may be in an idle or non-operational state.

Furthermore, after a determination that the received data no longer indicates a refrigerant detection, the duration of time monitored by the timer may be reset. However, the control signals to operate the HVAC system 150 in the alternative operating mode may continue to be transmitted for an additional threshold period of time (e.g., 1 minute, 5 minutes, 10 minutes, more than 10 minutes) to further enable dissipation of refrigerant external to the refrigerant circuit 161 that was previously detected. Thus, an additional timer may be initiated after the received data no longer indicates a detection of refrigerant in order to monitor an additional duration of time. In response to an absence of receiving an indication of a refrigerant detection within the additional duration of time, operation of the HVAC system 150 in the alternative operating mode may be suspended (e.g., control signals configured to cause operation of the HVAC system 150 in the alternative operating mode may no longer be transmitted to the HVAC system 150). Rather, control signals received from the thermostat 160 may be subsequently transmitted to operate the HVAC system 150 via the auxiliary control circuitry 164 in the primary operating mode, such as via the step described with respect to block 296.

Figure 10:
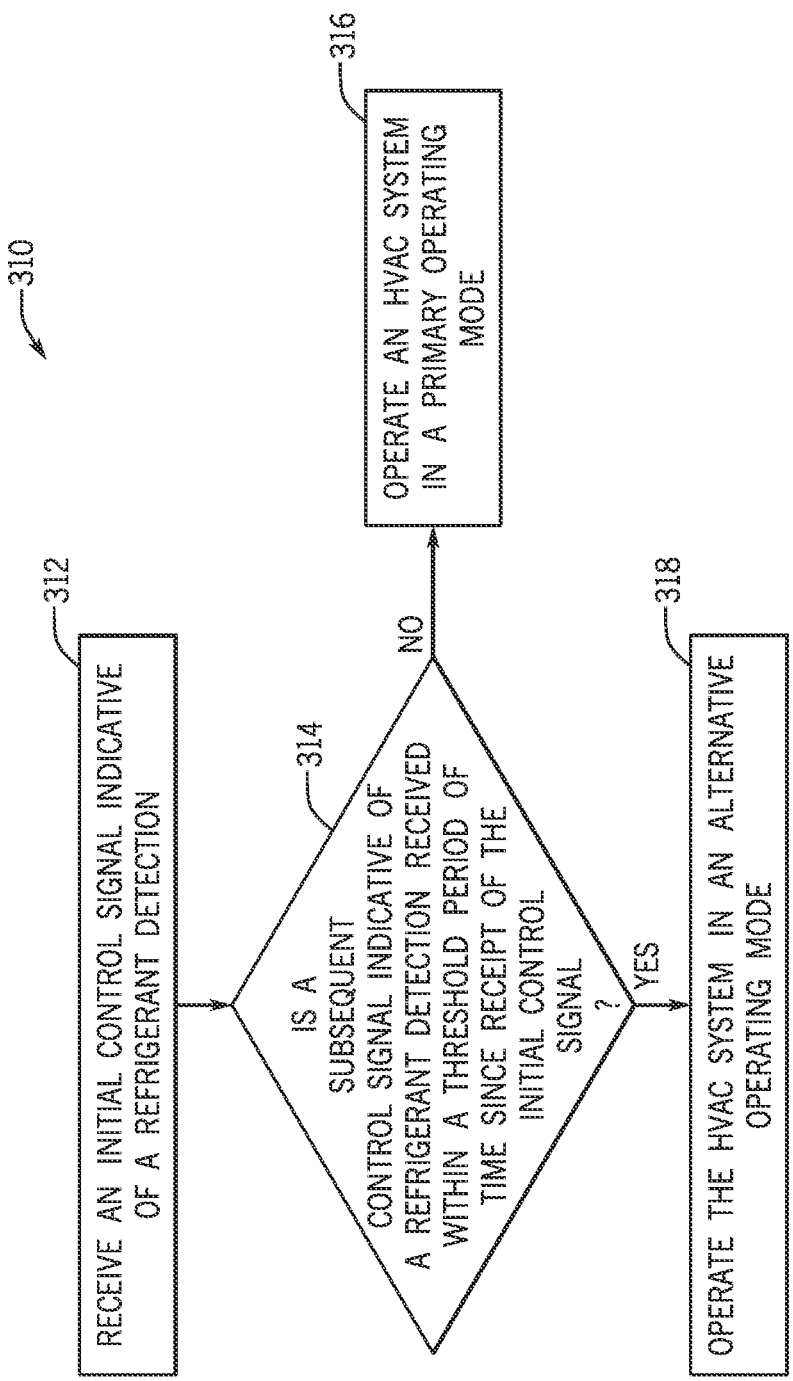
FIG. 10 is a flowchart of an embodiment of a method for operating an HVAC system based on receipt of control signals indicative of a detection of a refrigerant external to the HVAC system, in accordance with an aspect of the present disclosure.

FIG. 10 is a flowchart of an embodiment of a method 310 for operating the HVAC system 150. In some embodiments, the method 310 may be performed by the primary control circuitry 158 (e.g., the primary control circuitry 204, the primary control circuitry 234) for any of the control systems 156, 200, 230, 260 described above. At block 312, an initial control signal indicative of a refrigerant detection may be received. By way of example, the initial control signal may include one of the control signals transmitted (e.g., by the auxiliary control circuitry 164) in response to a detection of a refrigerant, such as via the step described with respect to block 300 of the method 290.

At block 314, a determination may be made regarding whether a subsequent control signal indicative of a refrigerant detection is received (e.g., by the primary control circuitry 158) within a threshold period of time (e.g., 1 second, 2 seconds, 5 seconds or more) since receipt of the initial control signal. To this end, a timer may be initiated in response to receipt of the initial control signal. By way of example, during a refrigerant detection by the sensor 162, control signals (e.g., pulsating control signals) indicative of the refrigerant detection may be received (e.g., by the primary control circuitry 158) at a particular frequency. As such, a determination that a subsequent control signal is received after receipt of the initial control signal within the threshold period of time (e.g., indicating receipt of control signals at the particular frequency) may verify that a refrigerant has been detected (e.g., external to the refrigerant circuit 161).

At block 316, in response to a determination that a subsequent control signal is not received (e.g., by the primary control circuitry 158) within the threshold period of time, the HVAC system 150 may operate in the primary operating mode instead of in the alternative operating mode. For example, non-receipt of the subsequent control signal within the threshold period of time may indicate an inadvertent transmission of the initial control signal. However, at block 318, in response to a determination that a subsequent control signal is received within the threshold period of time, the HVAC system 150 may be operated in the alternative operating mode. For instance, a fan may be operated to dissipate the detected refrigerant leak in the alternative operating mode. In some embodiments, the fan may be a variable speed fan, and the fan may be operated at a high speed (e.g., a maximum rated speed, a maximum allowable speed, an upper speed limit) in response to a determination that a subsequent control signal is received within the threshold period of time. Additionally or alternatively, certain components of the vapor compression system 72 may be suspended in the alternative operating mode.

In certain embodiments, the step described with respect to block 314 may be continually performed in response to receipt of a control signal indicative of a refrigerant detection. Thus, so long as a control signal is received within the threshold period of time since receipt of a previous control signal (e.g., indicating a repeated detection of a refrigerant external to the refrigerant circuit 161), the HVAC system 150 may be operated in the alternative operating mode. However, after a control signal is not received within the threshold period of time of a previous control signal (e.g., indicating the refrigerant is no longer detected), the HVAC system 150 may be transitioned from operation in the alternative operating mode to the primary operating mode. In this way, the method 310 may be continually performed to operate the HVAC system 150 in a corresponding operating mode.

The present disclosure may provide one or more technical effects useful in the operation of an HVAC system. For example, the HVAC system may include auxiliary control circuitry configured to operate based on whether there is an indication of a refrigerant detection external to a refrigerant circuit of the HVAC system. During non-receipt of data indicative of a detected refrigerant external to the refrigerant circuit, the auxiliary control circuitry may enable the HVAC system to operate based on a control signal, such as a call for conditioning, transmitted by a thermostat of the HVAC system. Operation of the HVAC system based on the control signal transmitted by the thermostat may include operation of a vapor compression system of the HVAC system to circulate the refrigerant through the refrigerant circuit to enable conditioning of an air flow. However, in response to a detection of a refrigerant external to the refrigerant circuit, the auxiliary control circuitry may block operation of the HVAC system based on the control signal transmitted by a thermostat in order to block further circulation of the refrigerant in the HVAC system. In some embodiments, the auxiliary control circuitry may also transmit a control signal to operate the HVAC system in an alternative operating mode. For example, in the alternative operating mode, the auxiliary control circuitry may operate a fan of the HVAC system to dissipate the refrigerant external to the refrigerant circuit. As such, in response to a detection of a refrigerant, the auxiliary control circuitry may operate the HVAC system to mitigate effects of the refrigerant external to the refrigerant circuit.

The auxiliary control circuitry may also be readily implemented in different embodiments of HVAC systems to enable different HVAC systems to operate in response to a detected external refrigerant. By way of example, a single embodiment of the auxiliary control circuitry may be configured to communicatively couple to different embodiments of thermostats that may be implemented in different HVAC systems. Additionally, the single embodiment of the auxiliary control circuitry may also be configured to communicatively couple to additional control circuitry and to a component of the HVAC system to enable transmission of a control signal (e.g., a control signal transmitted by the thermostat, a control signal generated and output by the auxiliary control circuitry) to cause the HVAC system to operate in the alternative operating mode in response to a detection of the refrigerant. In this manner, implementation of a particular or unique control system for each HVAC system to operate in response to a refrigerant detection may be avoided. As such, the auxiliary control circuitry may improve an ease of manufacture, design, and/or configuration of different HVAC systems to operate in response to a detected refrigerant. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A heating, ventilation, and/or air conditioning (HVAC) system, comprising:
auxiliary control circuitry configured to communicatively couple to a thermostat of the HVAC system, wherein the auxiliary control circuitry is configured to:
receive a control signal from the thermostat;
block subsequent transmission of the control signal to primary control circuitry separate from the auxiliary control circuitry in response to receipt of data indicative of a detected refrigerant external to a refrigerant circuit of the HVAC system;
in response to non-receipt of the data indicative of the detected refrigerant external to the refrigerant circuit, transmit, via a first connector port of the auxiliary control circuitry, the control signal to the primary control circuitry; and
in response to receipt of the data indicative of the detected refrigerant external to the refrigerant circuit, generate and transmit, via a second connector port of the auxiliary control circuitry, an alternative control signal, wherein the alternative control signal is configured to cause operation of a fan of the HVAC system.

2. The HVAC system of claim 1, wherein the primary control circuitry is configured to operate the refrigerant circuit of the HVAC system and the fan of the HVAC system.

3. The HVAC system of claim 2, comprising the primary control circuitry, wherein the primary control circuitry is a controller of an indoor unit of the HVAC system.

4. The HVAC system of claim 1, comprising a motor of the fan of the HVAC system.

5. The HVAC system of claim 1, wherein the auxiliary control circuitry comprises a third connector port configured to communicatively couple to a conventional thermostat and comprises a fourth connector port configured to communicatively couple to a communicating thermostat.

6. The HVAC system of claim 1, wherein the control signal comprises a call for conditioning, and the call for conditioning is configured to initiate operation of a compressor of the HVAC system.

7. The HVAC system of claim 1, wherein the auxiliary control circuitry is configured to transmit the alternative control signal to the primary control circuitry in response to receipt of the data indicative of the detected refrigerant external to the refrigerant circuit of the HVAC system, and the alternative control signal is configured to cause the primary control circuitry to output a notification indicative of a detection of refrigerant external to the refrigerant circuit.

8. A non-transitory computer-readable medium comprising instructions stored thereon, wherein the instructions, when executed by processing circuitry, are configured to cause the processing circuitry to:
receive a control signal from a thermostat of a heating, ventilation, and/or air conditioning (HVAC) system;
transmit, via a first connector port, the control signal received from the thermostat to primary control circuitry separate from the processing circuitry to enable operation of the HVAC system based on the control signal in response to non-receipt of data indicative of a refrigerant detected external to a refrigerant circuit of the HVAC system;
block transmission of the control signal received from the thermostat to the primary control circuitry to suspend an operation of the HVAC system in response to receipt of the data indicative of the refrigerant detected external to the refrigerant circuit; and
generate and transmit, via a second connector port, an alternative control signal in response to receipt of the data indicative of the refrigerant detected external to the refrigerant circuit to cause operation of a fan of the HVAC system.

9. The non-transitory computer-readable medium of claim 8, wherein the additional alternative control signal comprises a series of pulsating control signals transmitted at a set frequency.

10. The non-transitory computer-readable medium of claim 8, wherein the instructions, when executed by the processing circuitry, are configured to cause the processing circuitry to selectively transmit the alternative control signal to a motor of the fan of the HVAC system and to primary control circuitry configured to operate the HVAC system.

11. The non-transitory computer-readable medium of claim 8, wherein the instructions, when executed by the processing circuitry, are configured to cause the processing circuitry to:
determine that the refrigerant external to the refrigerant circuit is no longer detected;
monitor a duration of time elapsed after the determination that the refrigerant external to the refrigerant circuit is no longer detected; and
block transmission of the alternative control signal in response to a determination that the duration of time exceeds a threshold period of time.

12. The non-transitory computer-readable medium of claim 8, wherein the instructions, when executed by the processing circuitry, are configured to cause the processing circuitry to receive the data indicative of the refrigerant detected external to the refrigerant circuit of the HVAC system from a sensor disposed within an air flow path of the HVAC system.

13. The non-transitory computer-readable medium of claim 8, wherein the thermostat is a conventional thermostat or a communicating thermostat, and wherein the instructions, when executed by the processing circuitry, are configured to cause the processing circuitry to:
receive the control signal from the conventional thermostat via a third connector port; and
receive the control signal from the communicating thermostat via a fourth connector port.

14. A heating, ventilation, and/or air conditioning (HVAC) system, comprising:
a thermostat configured to transmit a control signal indicative of a call for conditioning; and
auxiliary control circuitry, comprising a first connector port configured to communicatively couple to primary control circuitry configured to operate a refrigerant circuit of the HVAC system; and a second connector port, wherein the auxiliary control circuitry is configured to:
receive the control signal from the thermostat;
in response to non-receipt of data indicative of a detection of refrigerant external to the refrigerant circuit of the HVAC system, transmit, via the first connector port, the control signal received from the thermostat to the primary control circuitry separate from the auxiliary control circuitry to cause operation of the refrigerant circuit based on the control signal;
in response to receipt of the data indicative of the detection of refrigerant external to the refrigerant circuit, block transmission of the control signal received from the thermostat to the primary control circuitry via the first connector port; and
generate and transmit, via the second connector port, an alternative control signal to cause operation of a fan of the HVAC system in response to receipt of the data indicative of the detection of refrigerant external to the refrigerant circuit.

15. The HVAC system of claim 14, comprising the primary control circuitry, wherein the primary control circuitry is configured to operate the refrigerant circuit based on the control signal.

16. The HVAC system of claim 15, wherein the primary control circuitry is configured to:
receive the alternative control signal; and
operate the fan of the HVAC system in response to receipt of the alternative control signal.

17. The HVAC system of claim 14, wherein
the second connector port is configured to communicatively couple to a motor of the fan of the HVAC system, and
the auxiliary control circuitry is configured to selectively transmit the alternative control signal to the primary control circuitry via the second connector port or to the motor of the fan via the second connector port in response to receipt of the data indicative of the detection of refrigerant external to the refrigerant circuit.

18. The HVAC system of claim 14, wherein the thermostat is a communicating thermostat, and the auxiliary control circuitry comprises a third connector port configured to communicatively couple to a conventional thermostat.

* * * * *